US010610777B2

(12) United States Patent
Doptis et al.

(10) Patent No.: US 10,610,777 B2
(45) Date of Patent: Apr. 7, 2020

(54) INTERACTIVE VIDEOGAME USING GAME-RELATED PHYSICAL OBJECTS

(71) Applicant: Activision Publishing, Inc., Santa Monica, CA (US)

(72) Inventors: Daniel M. Doptis, Troy, NY (US); Shea C. McCombs, Albany, NY (US); Jan-Erik Steel, Old Chatham, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 73 days.

(21) Appl. No.: 15/861,550

(22) Filed: Jan. 3, 2018

(65) Prior Publication Data

US 2018/0117461 A1 May 3, 2018

Related U.S. Application Data

(63) Continuation of application No. 14/919,574, filed on Oct. 21, 2015, now Pat. No. 9,868,059.

(51) Int. Cl.
A63F 13/24     (2014.01)
A63F 13/42     (2014.01)
A63F 9/24      (2006.01)
A63F 13/69     (2014.01)
A63F 13/214    (2014.01)
A63F 13/95     (2014.01)
A63H 3/00      (2006.01)

(52) U.S. Cl.
CPC .......... A63F 13/24 (2014.09); A63F 9/24 (2013.01); A63F 13/214 (2014.09); A63F 13/42 (2014.09); A63F 13/69 (2014.09); A63F 13/95 (2014.09); A63H 3/00 (2013.01); A63H 2200/00 (2013.01)

(58) Field of Classification Search
None
See application file for complete search history.

(56) References Cited

U.S. PATENT DOCUMENTS

| 8,647,202 B2* | 2/2014 | Crevin ............ A63F 13/04 446/141 |
| 9,352,213 B2 | 5/2016 | Yim et al. |
| 2010/0203968 A1 | 8/2010 | Gill et al. |
| 2011/0021109 A1* | 1/2011 | Le ............... A63H 3/28 446/300 |
| 2012/0157206 A1* | 6/2012 | Crevin ............ A63F 13/04 463/36 |

(Continued)

OTHER PUBLICATIONS

U.S. Appl. No. 14/919,574, filed Oct. 21, 2015, Daniel M. Doptis, Shea C. McCombs, Jan-Erik Steel, US 2017-0113131 A1, Notice of Allowance dated Apr. 12, 2017; Sep. 18, 2017.

(Continued)

Primary Examiner — James S. McClellan
Assistant Examiner — Peter J Iannuzzi
(74) Attorney, Agent, or Firm — Klein, O'Neill & Singh, LLP

(57) ABSTRACT

A videogame includes a peripheral device that senses the presence and identity of toys near or on the peripheral. Each of the toys includes an identification device such as an RFID tag. Each of the toys is also associated with a corresponding game character or object. The toys include touchpoints that can be used to affect and navigate gameplay. Further, the toys include programmable payloads that can be programmed in response to gameplay.

9 Claims, 18 Drawing Sheets

(56) References Cited

U.S. PATENT DOCUMENTS

| | | |
|---|---|---|
| 2013/0078600 A1 | 3/2013 | Fischer et al. |
| 2014/0121008 A1 | 5/2014 | Canessa |
| 2014/0273717 A1 | 9/2014 | Judkins et al. |
| 2015/0209664 A1 | 7/2015 | Haseltine |
| 2015/0360139 A1 | 12/2015 | Watry |
| 2016/0314609 A1 | 10/2016 | Taylor et al. |
| 2017/0056783 A1* | 3/2017 | Akavia .................. H04N 5/225 |

OTHER PUBLICATIONS

U.S. Appl. No. 14/919,575, filed Oct. 21, 2015, Daniel M. Doptis, Shea C. McCombs, Jan-Erik Steel, US 2017-01132129 A1, Office Action dated Mar. 24, 2017, Response to Office Action dated Jun. 26, 2017, Final Office Action dated Sep. 22, 2017, Response to Final Office Action dated Dec. 21, 2017.

* cited by examiner

INTERACTIVE VIDEOGAME USING GAME-RELATED PHYSICAL OBJECTS

CROSS-REFERENCE TO RELATED APPLICATION

The present application is a continuation of U.S. patent application Ser. No. 14/919,574, filed Oct. 21, 2015, the disclosures of which are incorporated by reference herein.

BACKGROUND OF THE INVENTION

The present invention relates generally to videogames and, more particularly, to a videogame that incorporates physical objects such as toys.

Toys such as action figures, cars, robots, weapons, buildings, and others provide countless hours of fun and enjoyment for many. Toys often serve as a vehicle for expanding the imagination and cultivating creativity.

Videogames also provide fun and enjoyment for many. Videogames allow game players to participate in a variety of simulated activities. Videogames allow game players to perform roles and experience activities that the game players may not be able or desire to experience directly, whether due to cost, danger, or equipment concerns, or simply due to a role or activity being a fantasy.

These experiences have generally been mutually exclusive, and users have been forced to sacrifice one form of play in favor of the other.

BRIEF SUMMARY OF THE INVENTION

One aspect of the invention provides a physical object, comprising: a first part comprising (i) a first capacitive touch sensor for receiving a user input and (ii) a first programmable electronic payload; a transceiver configured to provide for communication with a gaming device executing a videogame; circuitry for programming the first electronic payload in response to a command received from the gaming device executing a videogame, said command comprising information relating to a user customization received by the videogame; and circuitry for activating the first electronic payload in response to an indication of a user input received by the first capacitive touch sensor.

Another aspect of the invention provides a computer-implemented method for a videogame executing on a game device, comprising: detecting, by a detection device, a toy within a detection area of the detection device, said toy comprising a memory storing identification information of the toy and further comprising a first part having a first capacitive touch sensor for receiving a user input; receiving, by the videogame executing on a game device, the identification information of the toy and an indication of a user input received by the first capacitive touch sensor; determining, by the videogame executing on a game device, at least one parameter relating to the indication of a user input received by the first capacitive touch sensor; presenting, by the videogame executing on a game device, a virtual representation of the toy, said virtual representation comprising a first virtual part corresponding to the first part; and in response to determining at least one parameter relating to the indication of a user input received by the first capacitive touch sensor, presenting, by the videogame executing on a game device, a user interface for customizing the virtual representation of the toy's first virtual part.

Another aspect of the invention provides a computer-implemented method for a videogame executing on a game device, comprising: detecting, by a detection device, a toy within a detection area of the detection device, said toy comprising a programmable electronic payload and a first part having a first capacitive touch sensor for receiving a user input; receiving, by the videogame executing on the game device, a user selection relating to a virtual representation of the toy; receiving, by the toy, a command from the videogame executing on the game device, said command including information relating to the user selection; and programming, by the toy, the programmable electronic payload in response to receiving the command including information relating to the user selection, where said first programmable payload is configured to be activated in response to an indication of a user input received by the first capacitive touch sensor.

These and other aspects of the invention are more fully comprehended upon review of this disclosure.

DETAILED DESCRIPTION

Exemplary System

Figure 1:
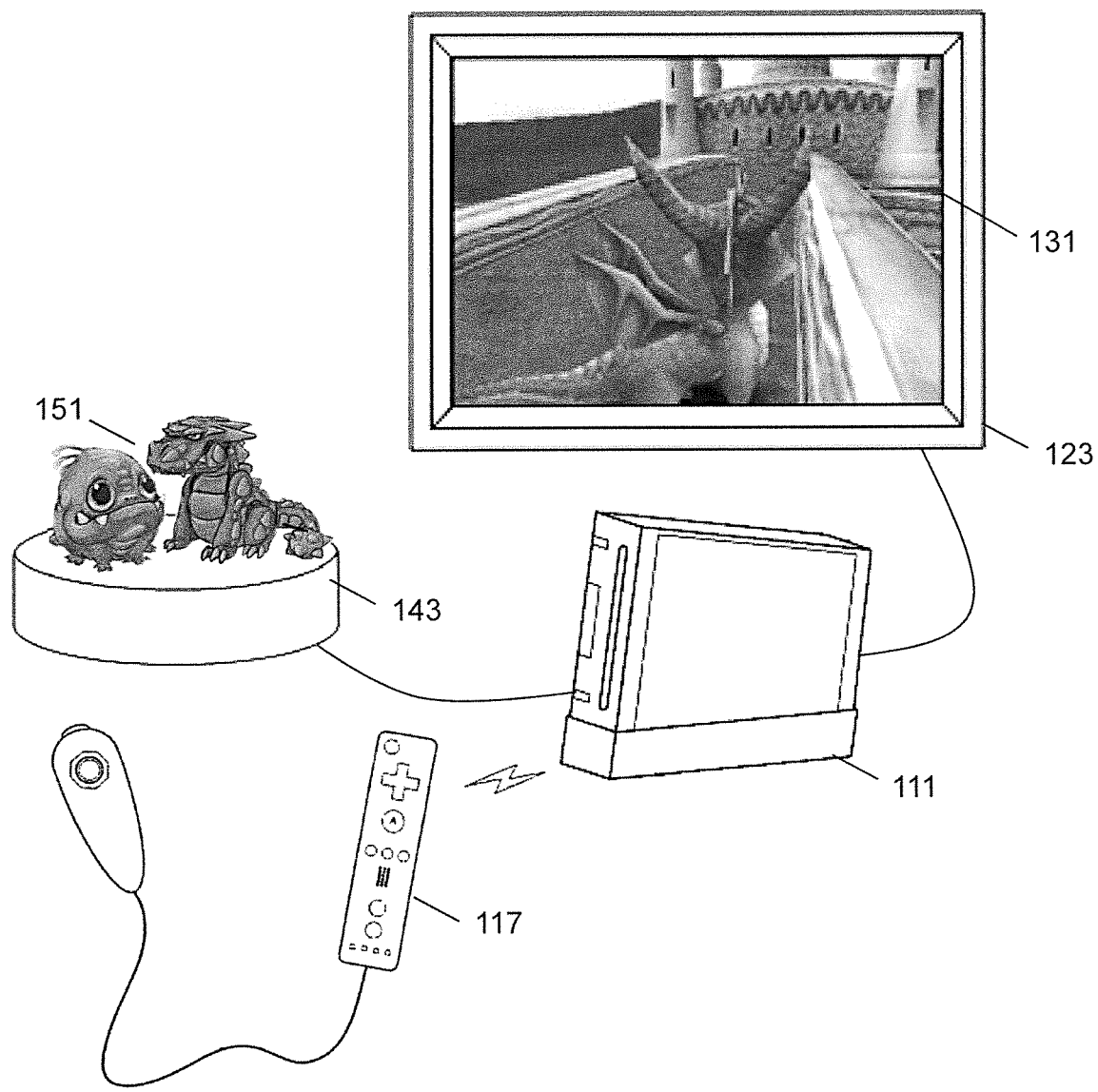
FIG. 1 illustrates an example of a videogame system in accordance with aspects of the invention.

FIG. 1 illustrates an example of a videogame system in accordance with aspects of the invention. The videogame system includes a game console 111 with a processor for executing program instructions providing for gameplay and associated circuitry, user input devices such as a game controller 117, a display device 123, and a detection device 143, which in various embodiments is configured to read information from and write information to an object such as a toy, but for convenience will generally be referred to as a detection device. The processor, responsive to inputs from the user input devices and the detection device, generally commands display on the display device of game characters in and interacting with a virtual world of gameplay and possibly each other. In addition, the processor, responsive to inputs from the detection device, may also add characters and objects to the virtual world, with the characters able to manipulate the added objects and move about the virtual world. For example, the processor may include characters in gameplay based on inputs from the detection device, and the processor may control actions and activities of game characters based on inputs from the user input devices.

The instructions providing for gameplay may be stored on removable media, for example, an optical disk. Accordingly, the game console may include an optical drive, for example, a DVD-ROM drive, for reading the instructions for gameplay. In some embodiments, instructions providing for gameplay may be downloaded from remote computing device and stored on a storage drive such as a solid-state drive or hard-disk drive. In some embodiments, the game console may be a personal computer, including similar internal circuitry as herein described, as well as, for example, a built-in display and built-in user input devices, such as a keyboard and a touch pad.

The display device is generally coupled to the game console by a cable, although in some embodiments a wireless connection may be used. In many embodiments, the display device is a liquid crystal display. In some embodiments, the display device is a television. A display screen 131 of the display device displays video images of game play, generally as commanded by the processor or other associated circuitry of the game console. In the embodiment of FIG. 1, the display screen shows a screenshot of videogame play. As illustrated, the screenshot shows a display of a character, generally controlled by and animated in accordance with user inputs, approaching an inanimate item in the form of what may be considered a castle.

The detection device, in some embodiments and as shown in FIG. 1, has a substantially flat upper surface for placement of toys thereon. Each toy includes a machine-readable identifier, for example, a radio-frequency identification (RFID) tag, a bar code, or other identifier. The machine-readable identifier may be sensed, read, and/or written by the detection device. The machine-readable identifier may include a numeric identifier. The machine-readable identifier allows the detection device, or the processor of the game console, to distinguish one toy from other toys, and the machine-readable identifier may therefore be considered to include a toy identifier. Each particular toy generally has its own distinct identifier. In some embodiments, the detection device has a plurality of substantially flat upper surfaces for placement of toys thereon, each capable of sensing, reading, and/or writing a toy's machine-readable identifier.

The game player generally places game toys, for example physical objects 151 in the form and representative of a dragon and another fantasy figure as shown in FIG. 1, on the flat surface of the detection device during game play. The toys are generally in the form of and representative of game items such as game characters, vehicles, weapons, locations, buildings, or other game items. In some embodiments the toys may be, or include features, as discussed in U.S. patent application Ser. No. 13/335,737, filed Dec. 22, 2011, entitled "Interactive Video Game With Visual Lighting Effects" and/or U.S. patent application Ser. No. 13/359,361, filed Jan. 26, 2012, entitled "Interactive Video Game With Toys Having Special Effects," the disclosures of both of which are incorporated herein by reference for all purposes.

Each toy includes machine-readable information, for example, memory, a radio-frequency identification (RFID) tag, or a barcode. In some embodiments, the machine-readable information may be encoded in the physical features of the toy itself or embedded on the surface of the toy. As discussed, the machine-readable information may be sensed, read, and/or in some embodiments written, by the detection device, in some embodiments indirectly by way of sending data and commands to the toy to write the data to memory of the toy. The machine-readable information may include a numeric identifier. The machine-readable information allows the detection device, or the processor of the game console, to distinguish one toy from other toys, and the machine-readable information may therefore be considered to include a toy identifier, and in some embodiments, each particular toy has its own distinct identifier. In addition, in many embodiments the machine-readable information includes additional information about a corresponding game character or item, including in some embodiments, the status of the game character or item in a game.

When a toy is read by the detection device, the detection device provides the game console an indication of the identifier and status information of the toy, and generally the processor of the game console commands display of a corresponding game item (e.g., character, vehicle, weapon, location, building, or other game item) or otherwise makes the corresponding game item available in gameplay. In some embodiments, multiple toys may be detected and made available for gameplay, either by a single reader in the detection device or, in some embodiments, by multiple readers in the detection device, each corresponding to a unique detection area of the detection device. For example, when a hat toy and a character toy are concurrently on the detection device, the corresponding character in the game may possess the corresponding hat. Thus, videogame play may be affected by use of real world objects, objects which may also be utilized for play and/or observation separate from videogame play.

Physical Objects with Touchpoints

Figure 17:
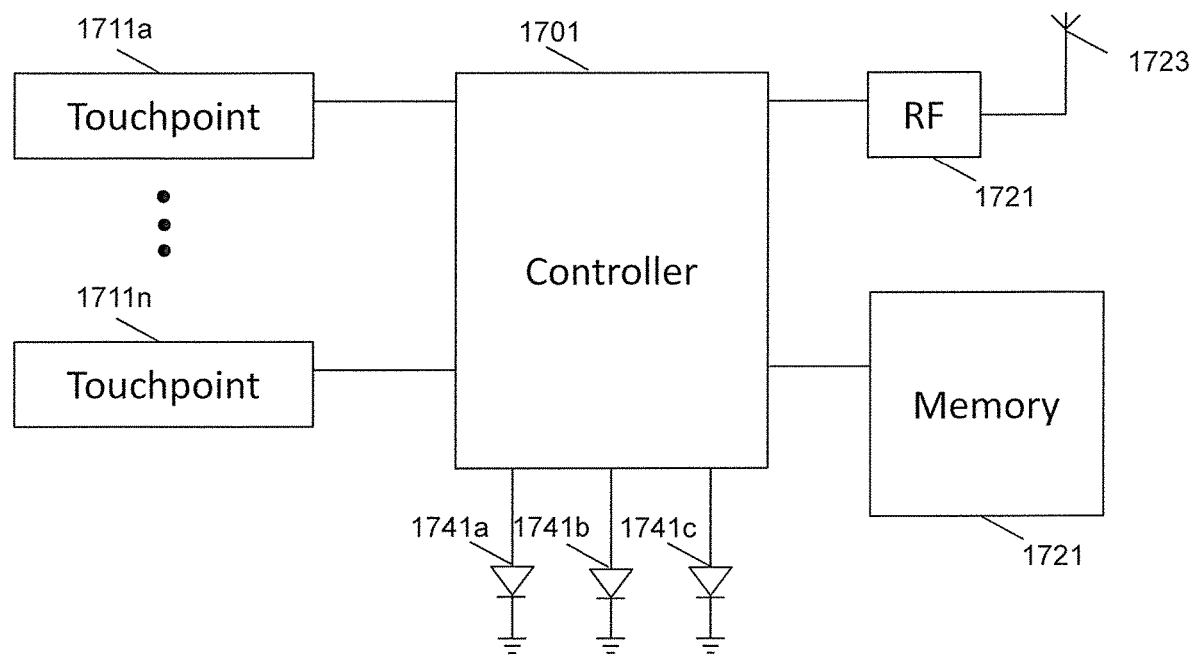
FIG. 17 is a block diagram of a physical object in accordance with aspects of the invention.

FIG. 17 is a block diagram of a physical object in accordance with aspects of the invention. According to aspects of the invention, the physical object comprises an RFID interface 1721 and antenna 1723 for communicating with a detection device or videogame console. The physical object may further comprise a controller 1701 coupled to one or more components of the physical object. In some embodiments, the controller adapts signals between protocols used by various components and interfaces of the physical object, including, for example, one or more touchpoints 1711a-n, one or more electronic payloads (in FIG. 17, LEDs 1741a-c), one or more memory components 1721, and one or more RFID interfaces 1721 and antennas 1723 for communicating with a detection device or videogame console. The controller generally includes a programmable device such as a microprocessor performing program instructions.

The physical object or toy may have one or more touchpoints 1711*a-n* that detect a user input and generates an output signal in response. As discussed in more detail throughout this disclosure, a user may use these touchpoints to conduct gameplay within the videogame and/or activate features of the physical object. As used herein, touchpoints may comprise one or more sensors or inputs on or embedded in the physical object. Non-limiting examples of touchpoints include capacitive touch sensors, proximity sensors, buttons, switches, triggers, accelerometers, tilt sensors, Hall effect sensors, gyroscopes, microphones (for detecting voice inputs), dials, or any other device capable of receiving user inputs. In some embodiments, touchpoints may also comprise sensors capable of detecting ambient light levels or hand waving (e.g., photodiodes and photoresistors).

In some embodiments, a touchpoint may comprise a touch-sensing circuit (e.g., a capacitive touch-sensing circuit). In some embodiments, the touchpoint may comprise one or more conductive portions or layers coupled to the touch-sensing circuit. The conductive portions or layers may comprise, for example, a conductive thermoplastic doped with conductive material or filler (e.g., graphite, nickel-plated carbon, nickel-graphite, etc.). Additionally or alternatively, the conductive portions or layers may comprise, for example, a conductive ink layer. In some embodiments, the conductive portions or layers may be further coated with a thin insulating layer.

The touchpoint's output signal may be transmitted to one or more components of the physical object and/or an external device (e.g., the detection device or videogame console discussed above). For example, the touchpoint's output signal may be used to write a memory component 1721 of the physical object. In some embodiments, the memory component may be a part of, for example, a writeable RFID tag. The value written to the memory component may reflect certain parameters relating to the output signal, for example, the source of the output signal (e.g., which touchpoint generated the output signal) and/or the type of input received by the touchpoint (e.g., single tap, actuation of a button or dial, etc.). In some embodiments, multiple or sequential touch inputs may be arranged as an event queue stored in the memory component. In some embodiments, the controller writes the memory component in response to receiving and processing the touchpoint's output signal.

The detection device or videogame console can then read the physical object's memory component to determine the parameters relating to one or more touch inputs received by the physical object. In some embodiments, the detection device or videogame console periodically polls the physical object's memory for touch inputs written in the physical object's memory component. In some embodiments, after reading the current queue of touch inputs, the queue is erased from the memory component. In some embodiments, the physical object may send a signal to the detection device or videogame console indicating one or more touch inputs have been received. In some embodiments, the signal may be sent using a transmitting component of the physical object. Alternatively, if the physical object does not include a transmitting component (e.g., the physical object only has a readable RFID component), the physical object may "signal" the detection device or videogame console in some other predefined fashion, for example by temporarily disabling and then re-enabling the physical object's RFID antenna (e.g., for 100 ms or some other suitable duration). This will cause the detection device or videogame console to re-detect the physical object, at which point it can check for new touch inputs recorded in the physical object's memory component. Essentially, the period of RFID silence is used as a signal to the detection device or videogame console to read new information from the RFID device.

In some embodiments, the physical object may comprise one or more electronic payloads (e.g., LEDs, audio payloads, haptic feedback, etc.). In some embodiments, the electronic payloads may be activated in response to receiving a user input. In some instances, these payloads may be useful in improving the user's experience where there is perceivable latency between the user's touch input and the resulting in-game event. For example, the perceived latency between touching the physical object and seeing the resulting in-game event can be masked by a physical object-to-game "transition" such as having an effect (e.g., LED) slowly disappear on the physical object while a corresponding effect appears in-game. In some embodiments, the payload is embedded in, or in close proximity to, the corresponding touchpoint.

In some embodiments, the touchpoints may be visible to the user, while in others, the touchpoints may be imperceptible or invisible. In some embodiments, the touchpoints may be capable of detecting different types of user inputs (e.g., single tap, double tap, long press, slide in a particular direction, shaking, movement in a particular direction or path, multiple simultaneous touches, pressure or touch area, near-touch or proximity, etc.) and generate different output signals accordingly.

In some embodiments, multiple touchpoints may cover and correspond to particular portions or parts of the physical object. For example, a toy figure may have distinct touchpoints covering one or more of the figure's arms, head, torso, legs, weapons, clothing, or accessories. As another example, a toy car may have distinct touchpoints covering one or more of the car's hood, doors, wheels, roof, or trunk. Similarly, a toy airplane may have distinct touchpoints covering one or more of the airplane's wings, nose, propellers, tail, or body.

Virtual Object Customizations

According to aspects of the invention, a user may conduct gameplay by placing the physical object on the peripheral. The identification information stored in the memory device of the object may be read via the peripheral and used to generate a virtual representation of the physical object for display in the videogame. Signals generated in response to a user contacting or otherwise actuating the physical object's touchpoints may be received by the peripheral and transmitted to the game console for processing.

In one embodiment, the signals output by the touchpoints may be used to facilitate the customization of the virtual representation of the physical object within the videogame. By touching a particular part of a physical object, for example, the videogame may present a user interface for customizing the virtual representation's corresponding part. For instance, in response to receiving a signal indicating a user has touched a toy figure's torso, the videogame may present a user interface for customizing the virtual character's torso (e.g., present the user a menu of selections relating to the character's armor/clothing, torso or skin color, torso size or shape, tattoos, etc.). As another example, in response to receiving a signal indicating a user has touched the weapon on a fighter jet, the videogame may present a user interface for customizing the virtual fighter jet's weapon or equipment.

Any number of user input mechanics and corresponding user interfaces may be used. For example, in some embodiments comprising physical objects with capacitive sensors, repeatedly tapping on a part of the physical object may cause the videogame to cycle through customization options for the corresponding virtual part. When a user repeatedly taps the hood of a toy car, for instance, each tap may cause the videogame to cycle through a menu of engine options for the car's virtual representation. Similarly, when a user slides their finger in a particular direction (e.g., up, down, left, right) on a touchpoint, the videogame may cycle through options or menus in a corresponding direction within the game.

Additionally or alternatively, physical objects may have accelerometers, gyroscopes, or other motion-sensing inputs. In such embodiments, receiving a signal that the user tilted, shook, or otherwise moved the physical object may cause the videogame to present a user interface for customizing the object. One of ordinary skill will appreciate that any number of alternative input mechanics and user interfaces may be employed.

Using touchpoints on a physical object to customize the virtual representation of the physical object presents several advantages. For example, managing inventory and customizing a character or in-game object is often complicated by the wide array of customizations and options available. Such tasks may be especially complicated for younger or novice users. The present invention presents an alternative to the complicated user interfaces and menu navigation associated with these tasks. Furthermore, the present invention offers a simplified method of navigating through a menu of options and selections by using touchpoints on a physical object.

Figure 18:
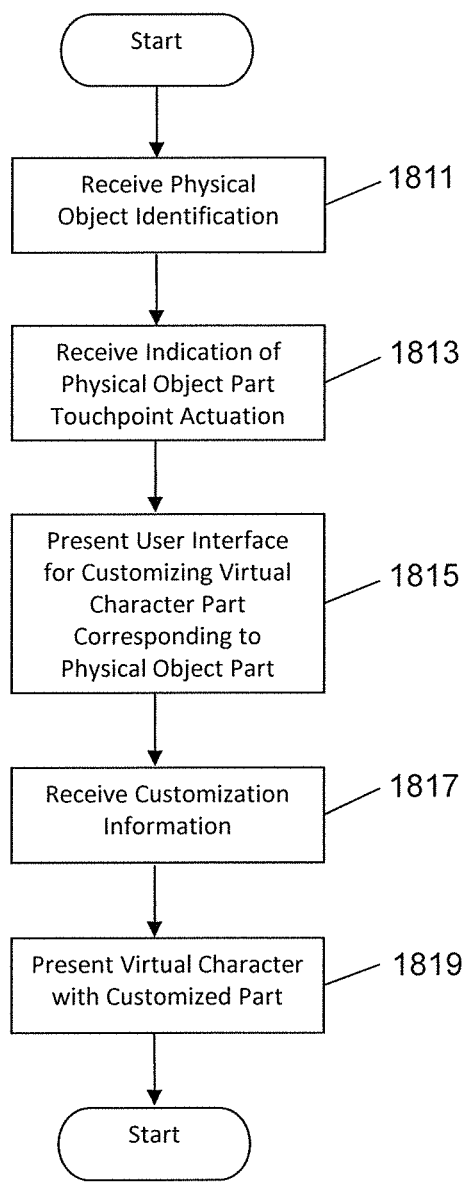
FIG. 18 is a flow diagram of a process for customizing a virtual video game character in accordance with aspects of the invention.

FIG. 18 is a flow diagram of a process for customizing a video game virtual character in accordance with aspects of the invention. In some embodiments the process is performed by the videogame system of FIG. 1. In some embodiments the process is performed by a processor programmed by program instructions, for example of a videogame console.

In block 1811 the process receives identification information of a physical object. The identification information may for example be an identifier of a toy. In various embodiments the identification information is read from a toy including an RFID tag storing the identification information. In various embodiments the RFID tag is read by an RFID reader in a peripheral coupled to a videogame console, with the peripheral providing the identification information to the videogame console. In some embodiments the identification information identifies a virtual character of a videogame, the virtual character corresponding to the physical object, and in some such embodiments the physical object is representative of the virtual character.

In block 1813 the process receives an indication of actuation of a touchpoint of the physical object. In various embodiments the indication of actuation of the touchpoint includes an identification of the touchpoint. In some embodiments the identification of the touchpoint includes an indication of a part of the physical object on or about which the touchpoint is located. In some embodiments the indication of actuation of the touchpoint includes an indication of a type of actuation of the touchpoint. In some embodiments the type of actuation of the touchpoint includes one, some or all of a single tap, a double tap, a long press, and a slide and, in some embodiments, a direction of slide.

In block 1815 the process presents a user interface for a user to customize the virtual character corresponding to the physical object. In some embodiments the user interface is a graphical user interface, which in some embodiments presents selectable options for customizing the virtual character. In various embodiments the user interface allows for customization of a virtual part of the virtual character corresponding to the part of the physical object on or about which the actuated touchpoint is located, and in some embodiments only allow for customization of that virtual part of the virtual character.

In block 1817 the process receives information as to customization of the virtual character, with in various embodiments the information relating to or relating solely to customization of the virtual part of the virtual character corresponding to the part of the physical object on or about which the actuated touchpoint is located.

In block 1819 the process presents the virtual character with a customized part. In various embodiments the process presents the virtual character with the customized part as part of play of a videogame.

Physical Object Customizations

According to aspects of the invention, a physical object may comprise one or more electronic or electrical payloads and circuitry for programming or powering said one or more payloads. In some embodiments, customizations made to the virtual representation of the physical object made within the videogame cause the game console to output commands and/or information relating to such customizations to the physical object. The commands and/or information may be used to program one or more of the physical object's payloads. In some embodiments, programming the physical object's payload comprises enabling the payload and/or setting the payload to one of a plurality of features already stored in the toy. Additionally or alternatively, the payload may be downloaded to the physical object's memory from an external source such as the game console. In some embodiments, the physical object's payload may be programmed with one or more instructions to be executed.

Once the payload is programmed in the physical object (e.g., by writing or setting bits of the physical object's memory), the physical object may receive a command or signal to activate the payload, for example, in response to a user contacting a touchpoint or in response to a command and/or signal received from the game console.

A payload may comprise, for example, one or more light sources (e.g., light emitting diodes, super luminescent diodes, lasers, etc.) that may be used to produce visual effects. Payloads may be comprised of other electronic or electrical components as well, for example components relating to audio or audio effects, movement of the physical object or its parts, radio-control functionality, images displayed on the physical object (e.g. a display device incorporated into the toy), or any number of known functions and effects. In some embodiments, the payload may be powered by a battery source in the physical object. Additionally or alternatively, the payload may be powered by an external source, for example, an alternating current power source or an inductive power source in the peripheral or game console.

The following examples illustrate the process of programming a physical object's payload in response to customizations made in-game. In one example, a user may customize a virtual representation of an action figure to have a particular magic spell ability. Information relating to the user's selection is output by the game console and received by the action figure. The information is used to program one of the figure's payloads with the audio representative of the magic spell. When the user contacts the touchpoint for activating the spell (e.g., a capacitive touch sensor layered on the character's wand), audio representative of the magic spell is output. As another example, a user may customize a virtual representation of an airplane to include a laser beam weapon. Information relating to this selection is used to program one of the physical object's payloads such that it is set to a laser beam sound effect. When the user contacts the touchpoint for activating the weapon, the laser beam sound effect payload is output.

In some embodiments, the command for programming the payload sets the payload to be one of a plurality of features already stored in the physical object. In other embodiments, the command sets the payload to be one of a plurality of features downloaded or received from an external source (e.g., the game console).

In some embodiments, the physical object includes circuitry for enabling or disabling activation of the payload. For example, in some embodiments the physical object may receive a command to activate the payload, but the payload will not be activated absent a prior or concurrent command to enable the payload. The game console may provide a command to enable the payload based on gameplay, for example attaining of an achievement or an achievement level by a game character associated with the physical object.

In some embodiments, activation of the payload, or an effect of activation of the payload, is irreversible. In some embodiments, enablement of activation of the payload is irreversible, with activation of the payload occurring whenever the toy has sufficient power to activate the payload. In some embodiments, the toy includes circuitry to allow enablement of activation of the payload, with the enablement of activation being irreversible. In some embodiments, the circuitry sets a memory element of the toy to indicate enablement of activation of the payload, and the payload is not capable of being activated unless the memory element is so set.

Exemplary Processor and Associated Circuitry

Figure 2:
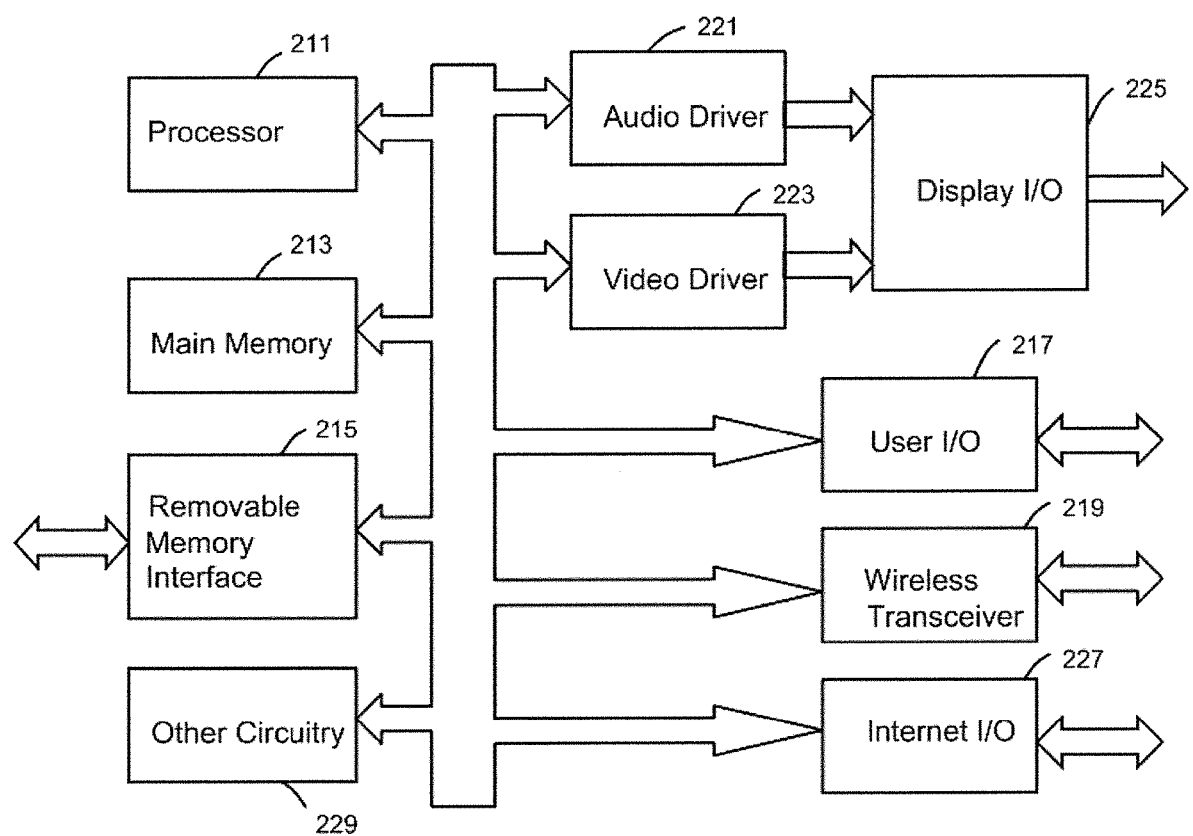
FIG. 2 is a block diagram of a videogame console in accordance with aspects of the invention.

FIG. 2 is an example of a block diagram of a processor and associated circuitry, for example, for a game console, useful in accordance with aspects of the invention. As shown in FIG. 2, a processor 211 is connected to other components via a bus. The other components include a main memory 213 and a removable memory interface 215 generally coupled to a removable memory device, for example, a DVD-ROM drive. The processor may execute instructions retrieved from the removable memory device to control game play and store game state information in the main memory. For example, the instructions may be for determining possible movements, positions, and locations of a game character.

The processor is coupled to an audio driver 221 and a video driver 223. The audio driver produces sound signals and the video driver produces image signals. The sound signals and image signals are transmitted from the game console via a display I/O device 225. The display I/O device generally supplies the sound and image signals to a display device external to the game console. Sound signals may also be supplied to a peripheral device such as a toy detection device.

The processor may also be coupled to a user I/O device 217, a wireless transceiver 219, an Internet I/O device 227, and other circuitry 229. The user I/O device may receive signals from a toy reader and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Exemplary Videogame Peripheral/Detection Device

Figure 3:
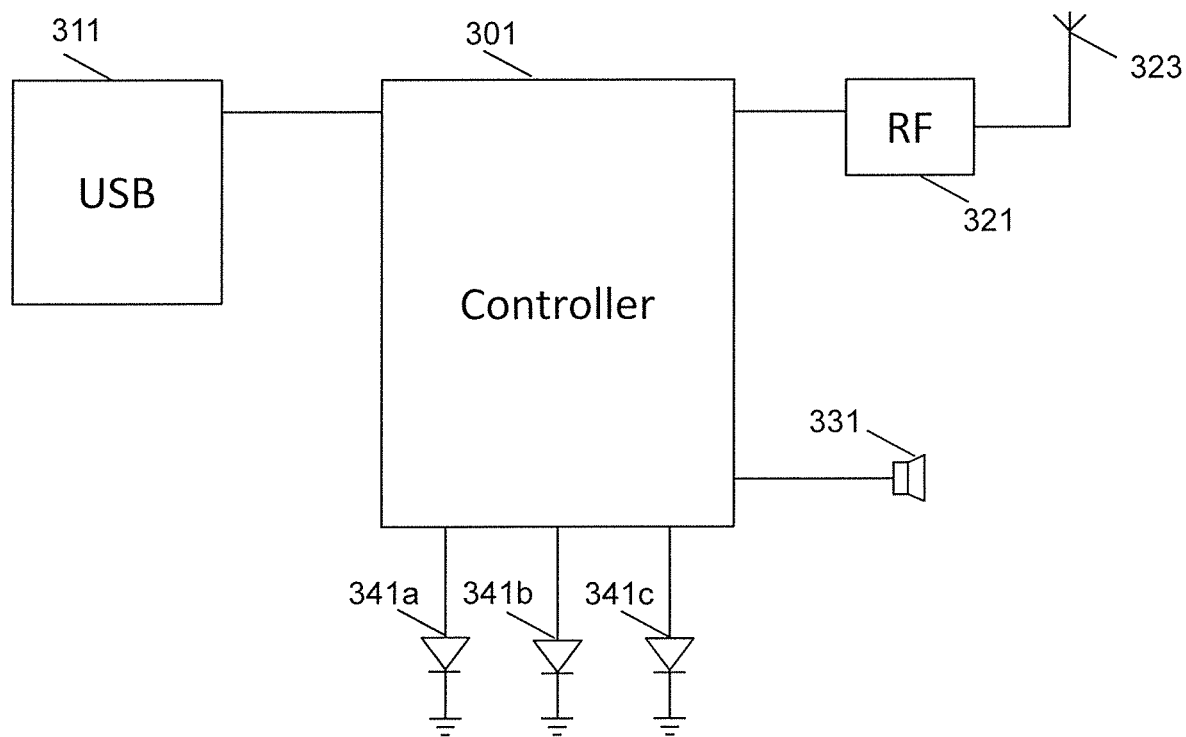
FIG. 3 is a block diagram of a videogame peripheral in accordance with aspects of the invention.

FIG. 3 is a block diagram of a videogame peripheral in accordance with aspects of the invention. The peripheral may be used in some embodiments as the detection device of FIG. 1. The peripheral may be used to provide information from the toy to a game console and, in some embodiments, from the game console to the toy or from one toy to another toy. Accordingly, the peripheral includes a universal serial bus (USB) interface 311 to communicate with the game console. In some embodiments, the peripheral may use a different interface, for example, a wireless interface for communication with the game console. The information communicated between the peripheral and the game console may be encrypted, and the information read from or written to the toy by the peripheral may also be encrypted.

The peripheral also includes a radio-frequency (RF) interface 321 to communicate with toys. In many embodiments, the radio-frequency interface is a radio-frequency identification (RFID) interface. In some embodiments, other wireless interfaces may be used, for example Bluetooth or Wi-Fi. In other embodiments, the peripheral may include a different interface for communicating with toys, such as an optical interface or a wired interface.

In one embodiment of an optical interface, the toy includes a light source, for example an LED, to provide information of the machine-readable information and a photodiode to receive information of commands, with circuitry operable within the toy to provide for associated operation of the LED and photodiode in performing communication functions. Power may be provided to the toy by way of a battery, by way of RFID operations, or by other sources. In such an embodiment, the toy reader similarly includes a photodiode and LED for communication with the toy.

In another embodiment, the peripheral includes an imaging device, for example a charge-coupled device ("CCD") and associated circuitry. In such embodiments, the imaging device may generate an image, for analysis by the peripheral or in most embodiments by the game console, with the image providing information related to the toy. In some embodiments, identity of the toy may be determined by information embedded in the surface or the toy or by the shape or other features, such as color or reflectivity, of the toy or portions of the toy. Similarly, identity and other information of the toy may be provided by image information placed on the toy, including, for example, information of stickers placed on the bottom of the toy, placed either prior to receipt of the toy by a user or by the user, in which case the information may be changed by the user in accordance with gameplay results. The toy may instead or in addition include barcode or barcode-like information, with the peripheral including barcode scanning components.

In some embodiments, the peripheral comprises a plurality of wireless, optical, and/or wired components for sensing, reading from, and/or writing to a plurality of toys, either simultaneously or otherwise. Further, in some embodiments, the functionality of the peripheral may be included in the game console itself. For example, the game console may include one or more of the discussed wireless, optical, or wired components for sensing, reading from, and/or writing to one or more toys.

The peripheral includes a controller 301 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what toys are present on the peripheral or to read from or write to a particular toy. In other embodiments, the controller may independently communicate with the radio-frequency interface and supply resulting information to a game console over the USB interface. For example, the controller may, via the radio-frequency interface, regularly detect what toys are newly present on the peripheral and report the detected toys to the game console via the USB interface. The controller generally includes a programmable device such as a microprocessor performing program instructions. The program instructions may be stored in the peripheral as firmware or downloaded from the game console.

The peripheral also includes, in some embodiments, a loudspeaker 331. The loudspeaker provides audio signaling to game players and the signaling may relate to a particular toy present on the peripheral. In some embodiments, the peripheral includes visual indicators such as light-emitting diodes 341*a-c*. The diodes may, for example, be illuminated with intensities or colors according to characteristics of the toy or to signal performance in the videogame of characters associated with toys on the peripheral. Both the loudspeaker and visual indicators are coupled to the controller. The controller signals the loudspeaker and visual indicators to operate according to commands received via the USB interface.

Exemplary Processes

Figure 4:
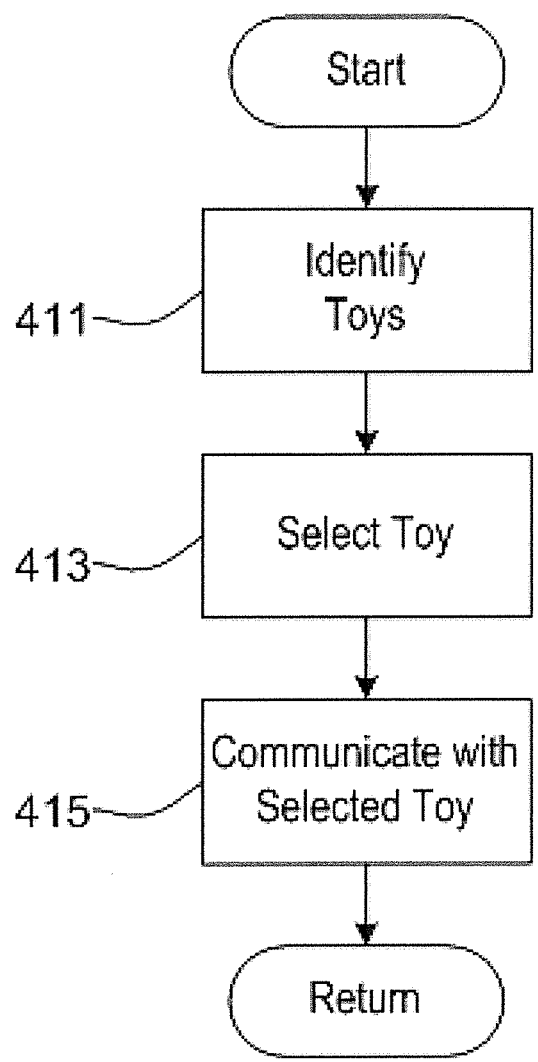
FIG. 4 is a flowchart of a process for communication with toys in accordance with aspects of the invention.

FIG. 4 is a flowchart of a process for communication with toys in accordance with aspects of the invention. The process may be implemented by a videogame peripheral, a videogame console, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toys via radio-frequency communication.

In block 411, the process identifies toys in a defined region. For example, the process may determine what toys are on one or more surfaces of a videogame peripheral (e.g., as described in connection with FIGS. 1 and 3). In various embodiments, the toys may be identified by RFID, barcodes, or optical recognition. In one embodiment, identification of toys includes a videogame peripheral reading identifiers of the toys and supplying the identifiers to a videogame console.

In block 413, the process selects a toy for communication. The process may select the toy by transmitting a selection command having an identifier matching the identifier of the toy. In many embodiments, the process expects to receive an acknowledgment of the selection from the toy. When an acknowledgment is not received, the process may retransmit the selection command or may signal a videogame associated with the process that the selected toy is not available.

In block 415, the process communicates with the selected toy. For example, the process may read from a particular memory location of the toy or may write to a particular memory location of the toy. In many embodiments, the process expects to receive an acknowledgment or response from the toy, and when not received, the process may retransmit the command or may signal the videogame associated with the process that the selected toy is not available. The process thereafter returns.

Figure 5:
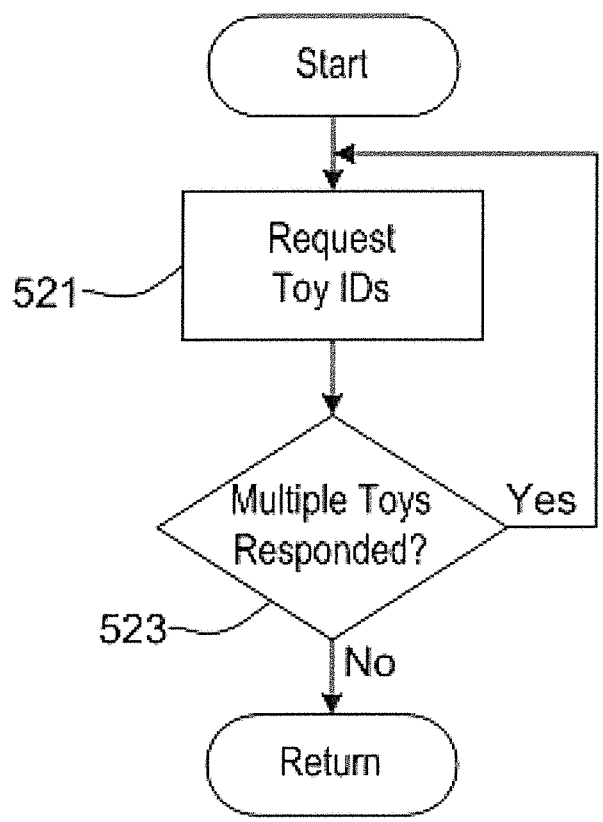
FIG. 5 is a flowchart of a process for identifying toys in accordance with aspects of the invention.

FIG. 5 is a flowchart of a process for identifying toys in accordance with aspects of the invention. The process may be performed as part of a process for communication with toys such as the process of FIG. 4. Accordingly, the process may be performed by a videogame console, a videogame peripheral, or a combination of devices, and the process may use a processor configured by program instructions.

In block 521, the process requests that toys send their identifiers. For example, in an embodiment of the process that uses the ISO/IEC 14443 protocol, the process may transmit a request command (REQA) or a wake-up command (WUP). The process listens for and receives any responses to the request that toys send their identifiers. Each identifier is generally unique to a particular toy.

In block 523, the process determines whether multiple toys responded to the request sent in block 521. For example, multiple toys may respond when there are multiple toys in a region that receives the request of block 521. The process may determine that multiple toys responded by detecting a collision between identifiers in the responses received in block 521. When the process determines that multiple toys responded, the process returns to block 521; otherwise, the process returns. The process may also determine that no toys responded. In various embodiments, the process may return when no toys responded or may return to block 521.

The process may, in block 521, include a range of identifiers in the request that toys send their identifiers. For example, the process may include a string of bits (for example, least-significant bits) in the request with only toys having identifiers with starting bits having values that match the string being requested to send their identifiers. The process may iterate through block 521 and block 523 with an increasingly narrow range of identifiers in the request until an identifier is individually received from each toy. The string of bits included in the request that toys send their identifiers may include the bits that were received by the process in block 521 prior to the collision detected in block 523 followed by a zero bit, and in a subsequent iteration followed by a one bit. For example, after sending a request for all toys to send their identifiers, the process may receive a one bit and a zero bit followed by a collision of bit values. The process accordingly requests toys whose identifiers start with one, zero, and zero to send their identifiers, and depending on the response or responses received may add additional bits to the string of bits in the request for identification. The process later requests toys whose identifiers start with one, zero, and one to send their identifiers, and depending on the response or responses received may add additional bits to the string of bits in the request for identification. The process may iterate through block 521 and block 523 performing a binary tree search for identifiers.

Figure 6:
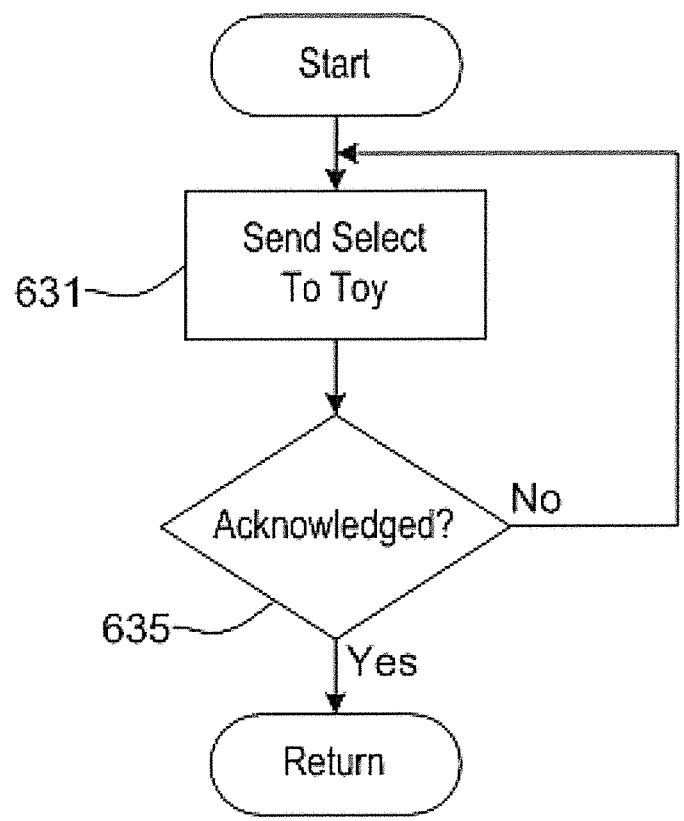
FIG. 6 is a flowchart of a process for selecting a toy in accordance with aspects of the invention.

FIG. 6 is a flowchart of a process for selecting a toy in accordance with aspects of the invention. The process may be part of a process for communication with toys such as the process of FIG. 4. Accordingly, the process may be performed by a videogame console, a videogame peripheral, or a combination of devices, and the process may use a processor configured by program instructions.

In block 631, the process selects a toy for further communication. The process may, for example, select the toy by sending a select command (SEL) that includes the identifier of the selected toy.

In block 635, the process determines whether it received an acknowledgment from the toy in response to the selection of block 631. The process may, for example, determine that it received an acknowledgment when it receives a selection acknowledge (SAK) message from the selected toy. When the process determines that it has received an acknowledgment, the process returns; otherwise, the process returns to block 631 to retry selecting the toy. In other embodiments, the process may return when an acknowledgment has not been received. When the process does not receive an acknowledgment, the process may additionally inform a videogame associated with the process that the selected toy is not present.

Figure 7:
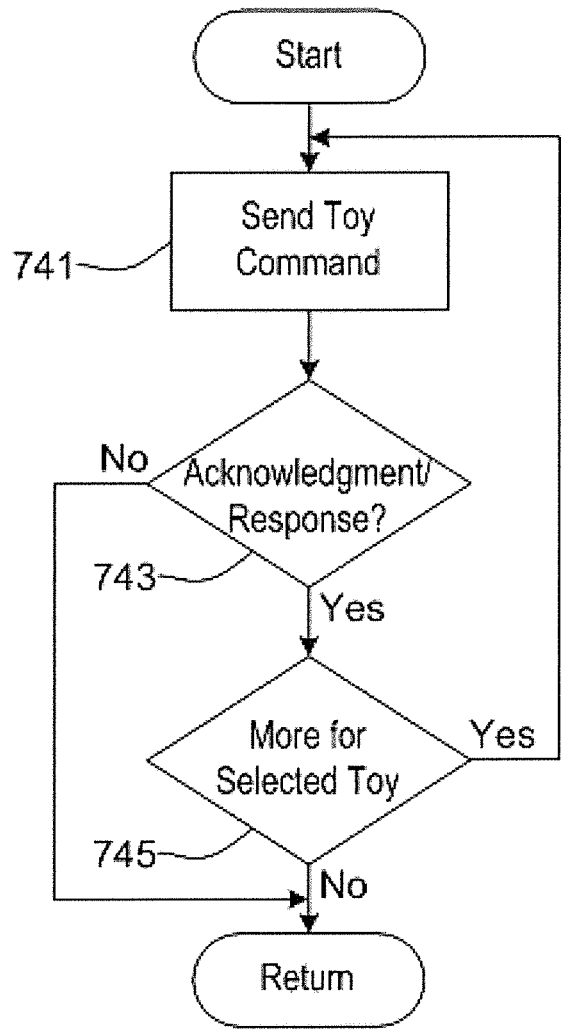
FIG. 7 is a flowchart of a process for communicating commands with a toy in accordance with aspects of the invention.

FIG. 7 is a flowchart of a process for communicating commands with a toy in accordance with aspects of the invention. The process may be as part of a process for communication with toys such as the process of FIG. 4. Accordingly, the process may be performed by a videogame console, a videogame peripheral, or a combination of devices, and the process may use a processor configured by program instructions.

In block 741, the process sends a command to the toy. For example, the process may send a read command to acquire data from the toy or a write command to supply data to the toy. Accordingly, the command may include an address value indicating a memory location in the toy to be accessed.

In block 743, the process determines whether it received an acknowledgment from the toy in response to the command sent in block 741. The process may, for example, determine that it received an acknowledgment when it receives a message containing a positive acknowledgment (ACK) from the toy. For a read command, the acknowledgment may include the data read. When the process determines that it has received an acknowledgment, the process continues to block 745; otherwise, the process returns. In other embodiments, the process may return to block 741 to retry sending the command when an acknowledgment has not been received. When the process does not receive an acknowledgment, the process may additionally inform a videogame associated with the process that the toy with which communication is sought is not present.

In block 745, the process determines whether it has any more commands to send to the toy. The process may determine that it has more commands for the toy, for example, by checking a list of actions in the videogame associated with the process. When the process determines that there are more commands for the toy, the process returns to block 741; otherwise, the process returns.

Figure 8:
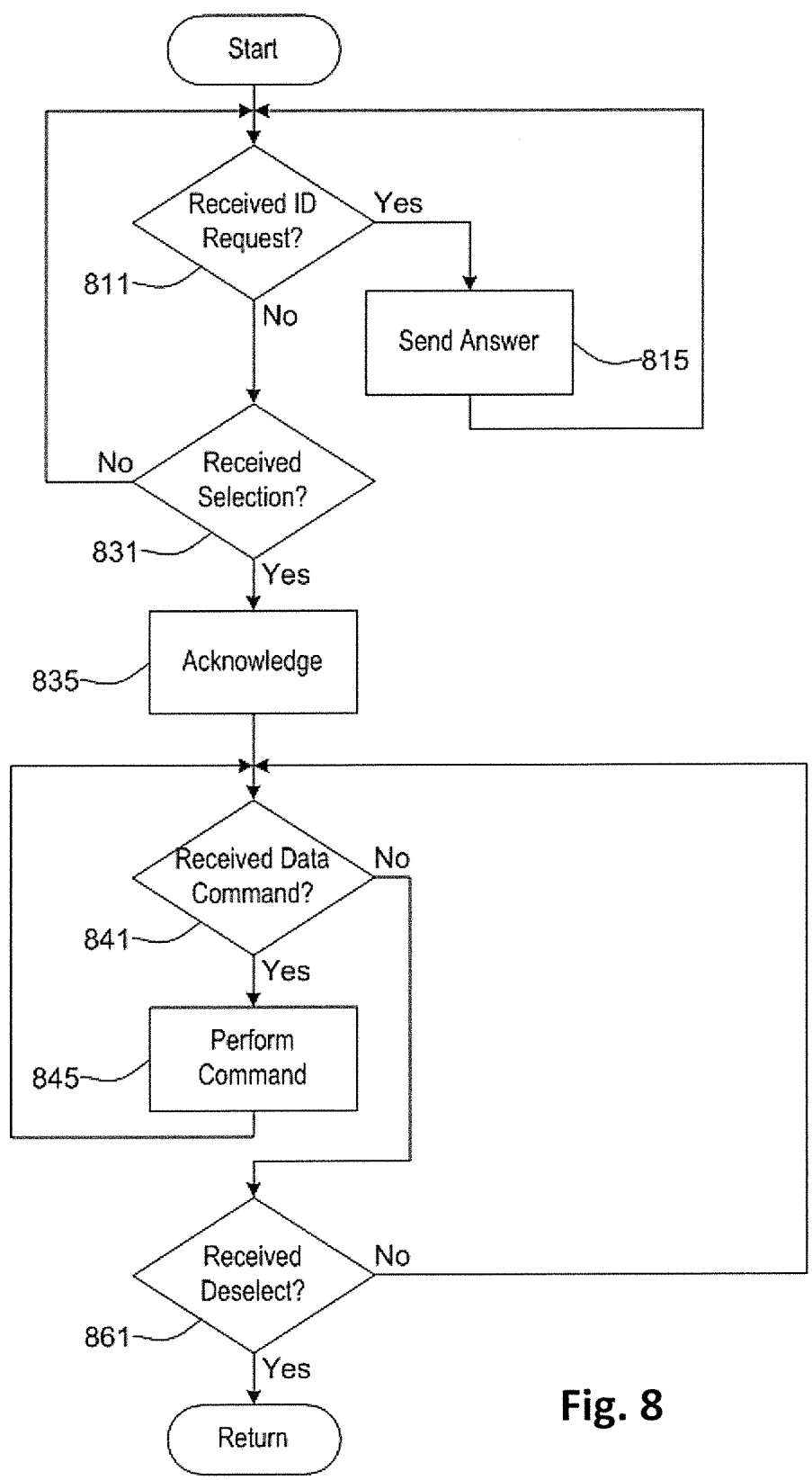
FIG. 8 is a flowchart of a process for communication with a videogame peripheral in accordance with aspects of the invention.

FIG. 8 is a flowchart of a process for communication with a videogame peripheral in accordance with aspects of the invention. The process may be implemented by a toy used in a videogame, for example, one of the toys as shown in FIG. 1. The process may be performed utilizing a standardized protocol, for example, the ISO/IEC 14443 standard for Identification Cards. Accordingly, the process may communicate with a videogame peripheral via radio-frequency communication. Furthermore, the process may communicate with a videogame peripheral that performs any of the processes illustrated in FIGS. 4-7.

In block 811, the process determines whether it has received a request for an identifier associated with the toy. For example, in an embodiment of the process that uses the ISO/IEC 14443 protocol, the process may determine whether it has received a request command (REQA) or a wake-up command (WUP). A request for an identifier may include a range of identifiers that are requested to respond, and the process determines that it has received a request for its identifier when its identifier is within the requested range of identifiers. When the process determines that it has received a request for its identifier, the process continues to block 815; otherwise, the process continues to block 831.

In block 815, the process sends an answer to the request for its identifier. The answer generally includes the identifier or a portion of the identifier. For example, the request for the identifier may have included a portion of the identifier with the process including the remaining portion of the identifier in the answer. Thereafter, the process returns to block 811.

In block 831, the process determines whether it has been selected for further data communication. The process may, for example, determine that it has been selected when a select command (SEL) is received that includes the identifier of the toy. When the process determines that it has been selected, the process continues to block 835; otherwise, the process returns to block 811.

In block 835, the process acknowledges the selection determined in block 831. The process may, for example, transmit a selection acknowledge (SAK) message.

In block 841, the process determines whether it has received a data command. The process may, for example, determine that it has received a command instructing it to read data from or write data to a memory. When the process determines that it has received a data command, the process continues to block 845; otherwise, the process continues to block 861.

In block 845, the process performs the command of block 841. For example, the process may perform a read command by reading values from the memory and transmitting the values. In another example, the process may perform a write command by writing values supplied with command to the memory and transmitting an acknowledgment of the command. Thereafter, the process returns to block 841.

In block 861, the process determines whether it has been deselected from further data communication. The process may, for example, determine that it has been deselected when it receives a deselect command (DESEL) or a halt command (HLTA). When the process determines that it has been deselected, the process returns; otherwise, the process returns to block 841. In some embodiments, the process may wait in a halted state until it receives a wake-up command (WUP) before it returns. When the process is in the halted state, it does not respond to identification request commands, selection commands, or data commands.

Figure 9:
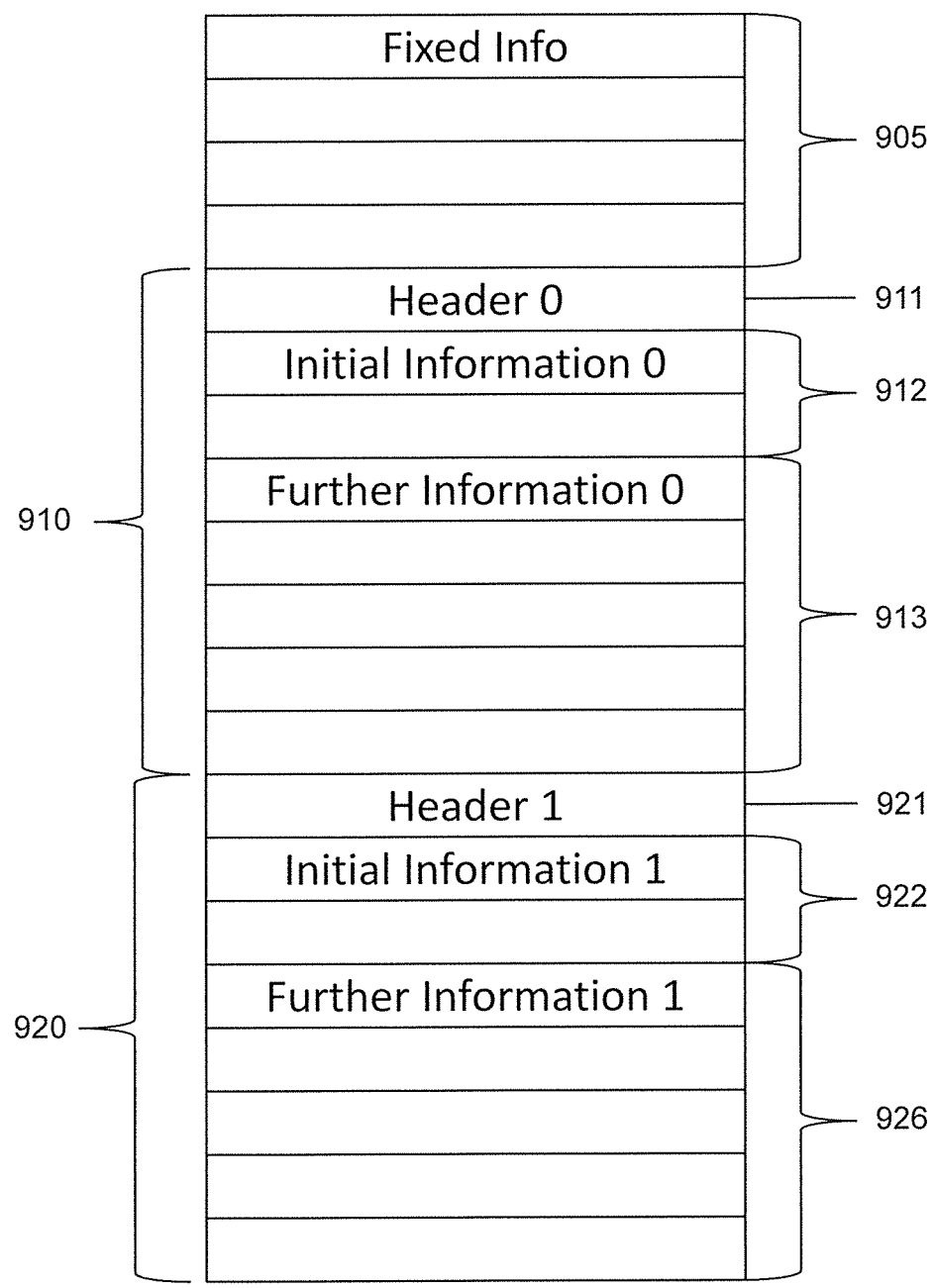
FIG. 9 is a diagram of data structure in accordance with aspects of the invention.

FIG. 9 is a diagram of data structure in accordance with aspects of the invention. The structure may be used to store data in a memory of a toy. Information about the toy, such as its characteristics and its status, are stored at various locations in the data structure. Although various fields of the data structure are shown in particular locations in FIG. 9, the data structure may use a different arrangement of the fields.

The data structure includes an area of fixed information 905. The fixed information includes information that identifies a type of toy and a particular instance of the toy, for example, the fixed information may include a 32-bit serial number. The fixed information may also include an identification of objects related to the toy, such as an identification of a trading card. The fixed information generally includes a field for data verification, for example, a cyclic-redundancy check value or checksum. The fixed information is generally written when the toy is created and not thereafter changed.

The data structure also includes a first data area 910 and a second data area 920. Each of the data areas contains corresponding fields for certain values representing status information about a game play character associated with the toy. However, the first data area and the second data area contain values that reflect the toy's status at different times. For example, the first data area may contain current values and second data area may contain previous values. How which of the data areas is current may be determined and controlled is described further below.

The first data area 910 includes a first header 911. The first header includes information about the toy that may change frequently during game play, such as fields that store score values, experience levels, or money values. The first header may also include a field indicating how much cumulative time the toy has been used for game play. The first header also contains a sequence field that may be used to determine whether the first data area contains current data.

The first data area 910 includes a first initial information area 912. The first initial information area includes information about the toy for use in adding the character associated with the toy to game play. For example, the first initial information area may include a field that stores a name for the toy. The first initial information area may include additional fields that store information useful for displaying a representation of the character associated with the toy in the game. For example, there may be information indicating upgrades that have been acquired for the character associated with the toy or objects the character may be wearing, such as hats or using such as weapons. In some embodiments, however, the fixed information may contain sufficient information for adding the character associated with to the toy to game play, with the fixed information used instead of the initial information.

The first data area 910 includes a first further information area 913. The first further information area includes fields that indicate additional information about the character's status beyond the information contained in the first header and the first initial information area. The fields in the first further information area may include, for example, a value indicating when the character associated with the toy most recently joined the game, a value indicating when the toy was first used in the game, an indication of a player to which the toy belongs, and an indication of what challenges or skill tests the character associated with the toy has completed in the game.

The first data area generally includes one or more fields for data verification, for example, checksums. In one embodiment, the first header includes three checksums: a checksum for the entire first data area, a checksum for the initial information area, and a checksum for the header itself. The inclusion of three checksums may allow the corresponding areas to be verified or updated without reading or writing other areas.

The second data area 920 includes a second header 921, a second initial information area 922, and a second further information area 923. Each of the areas in the second data area corresponds to a like named area in the first data area. In some embodiments, the data structure includes additional data areas, for example, a third data area and a fourth data area.

Figure 10:
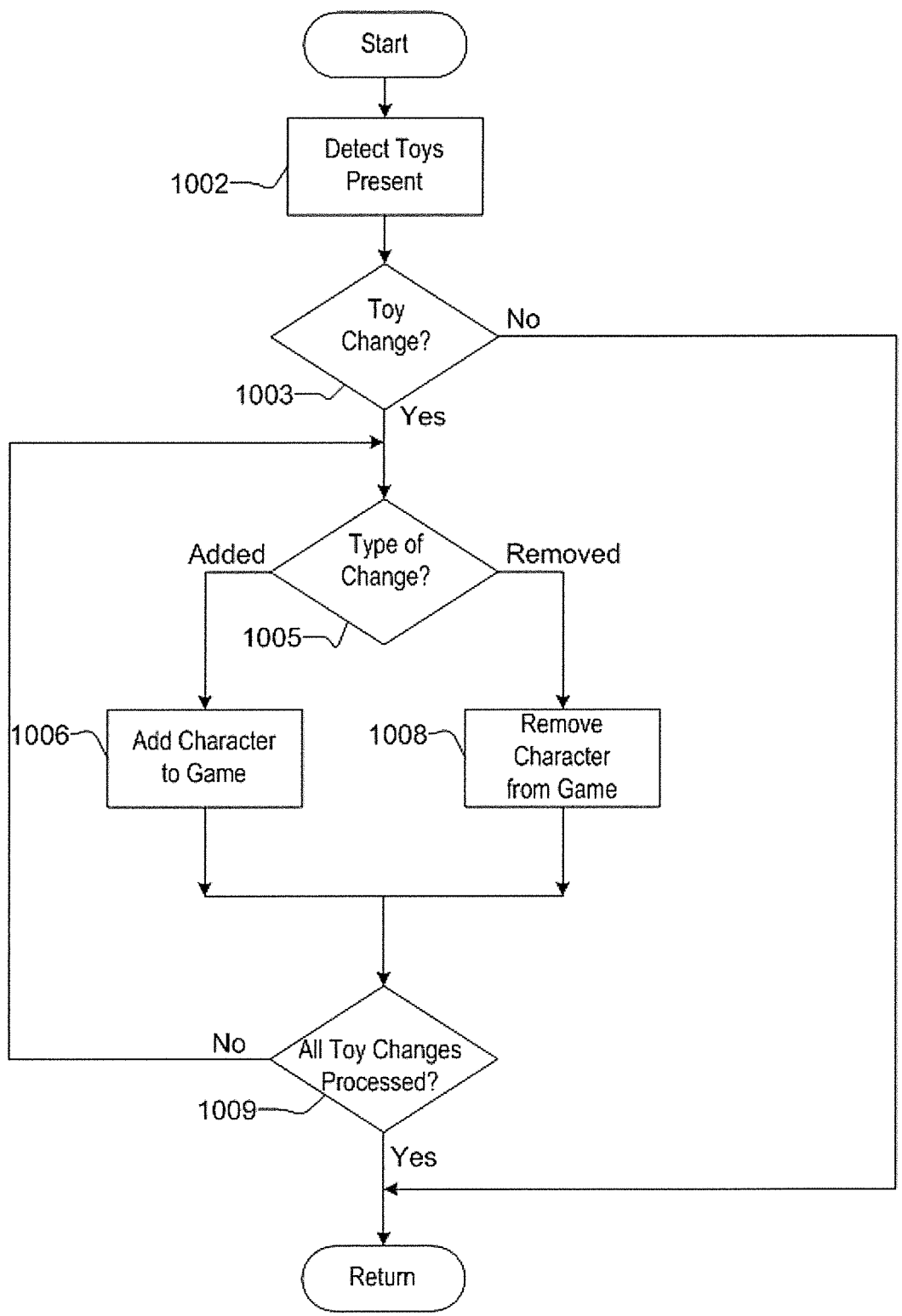
FIG. 10 is a flowchart of a process for changing characters present in a videogame in accordance with aspects of the invention.

FIG. 10 is a flowchart of a process for reading information from a toy in accordance with aspects of the invention. The process may be performed by a videogame console, a videogame peripheral, or a combination of devices, and the process may use a processor configured by program instructions. Additionally, the process is generally performed repeatedly during play of the videogame, for example, every second.

In block 1002, the process detects toys present on or near a toy reader. In some embodiments, the process detects toys using a videogame peripheral as described with reference to FIG. 3, and the process may detect which toys are present using a process as described with reference to FIG. 5.

In block 1003, the process determines whether there has been a change in the toys present. For example, the process may compare identifiers of the toys detected in block 1002 to a list of toy identifiers currently considered present in the videogame or detected on a prior execution of the process. In some embodiments, the process may use a count of the toys present to determine a change in the toys present. When the process determines that there has been a change in the toys present, the process continues to block 1005; otherwise, the process returns.

In block 1005, the process determines a type of change in the toys present. When the process determines that the type of change in the toys present includes an addition of a toy, the process continues to block 1006; when the process determines that the type of change in the toys present includes a removal of a toy, the process continues to block 1008. When the type of change includes both addition and removal, the process, in various embodiments, may determine the type of change based on a fixed priority, a dynamic priority, or randomly depending, for example, on characteristics of the videogame. In other embodiments, the process may continue to block 1006 and block 1008 concurrently.

In block 1006, the process adds a character associated with an added toy to the videogame. For example, the process may display a representation of the character in the game and include the character in game play. When multiple toys have been added the process may select one of the toys to be added first. For example, the process may select a toy based on a prioritization or randomly. In other embodiments, the process may add characters associated with multiple toys concurrently. Thereafter the process continues to block 1009.

In block 1008, the process removes the character associated with a removed toy from the videogame. For example, the process may remove display of a representation of the character from the game and exclude the character from subsequent game play. When multiple toys have been removed the process may select one of the toys to be removed first. In other embodiments, the process may remove multiple toys concurrently. Thereafter the process continues to block 1009.

In block 1009, the process determines whether all of the changes in toys present have been processed. The process may, for example, form a list of changes in block 1003 and remove toys from the list when the toys are added to the game in block 1006 or removed from the game in block 1008. When the process determines all of the changes have been processed, the process returns; otherwise, the process returns to block 1005.

Figure 11:
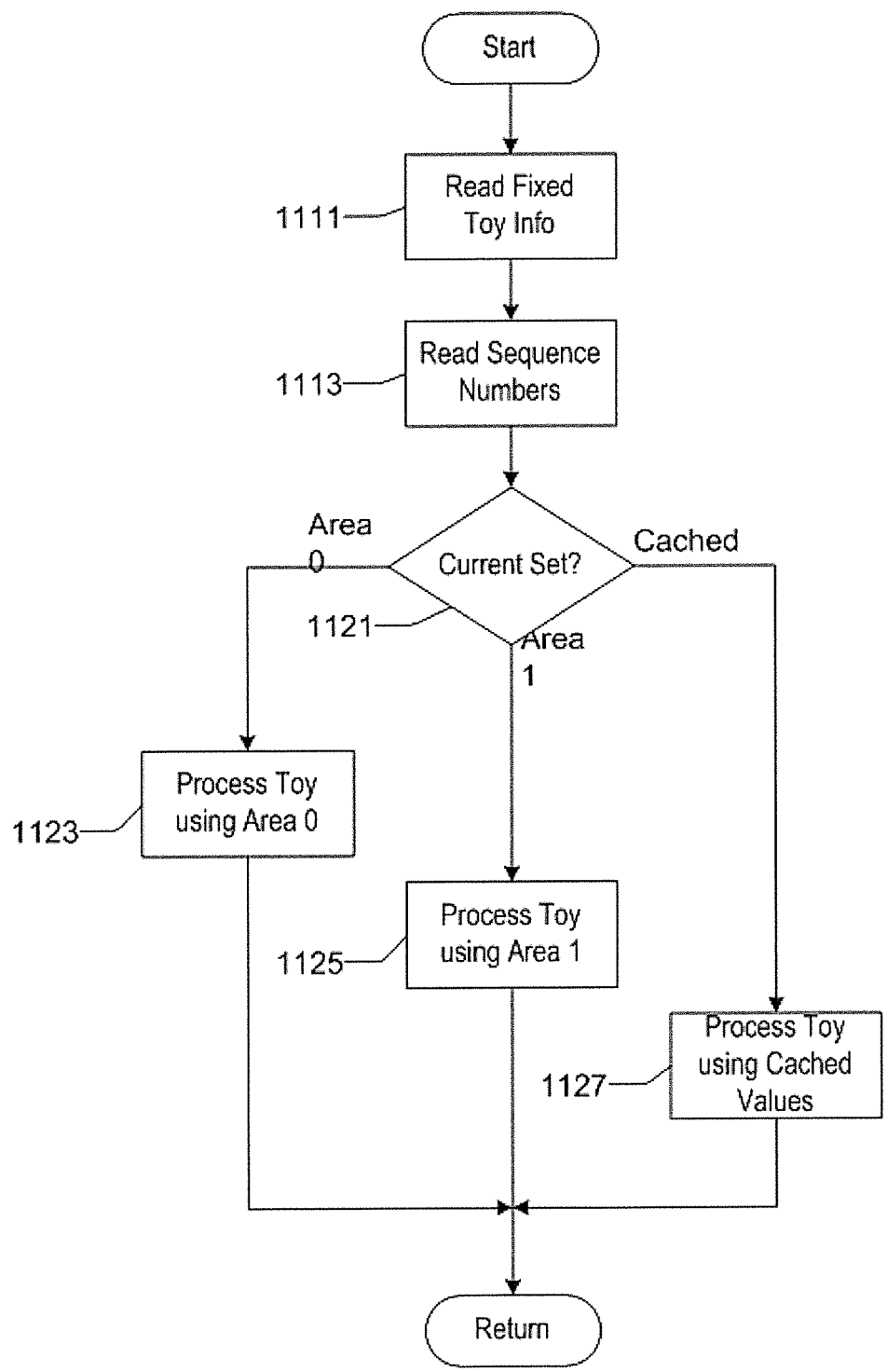
FIG. 11 is a flowchart of a process for adding characters in a videogame in accordance with aspects of the invention.

FIG. 11 is a flowchart of a process for adding characters in a videogame in accordance with aspects of the invention. The process may be performed by a videogame console, a videogame peripheral, or a combination of devices, and the process may use a processor configured by program instructions. The process of FIG. 11 may be performed in association with the process for changing characters present in a videogame of FIG. 10. Additionally, the process may be used with toys that store information in a data structure as illustrated by FIG. 9. Multiple instances of the process may be concurrently, for example, an instance of the process for each of multiple toys.

In block 1111, the process reads fixed information from a toy. The information may be read using a process as shown in FIG. 4. The fixed information includes values that uniquely identify the toy and type of toy.

In block 1113, the process reads sequence values for each of multiple data areas of toy information. The flowchart of FIG. 11 illustrates a process for toys with two data areas, data area 0 and data area 1, but other numbers of data areas may be used. The sequence numbers may be stored in headers of the data areas. Each sequence value indicates when, in comparison to other headers, the header was written. For example, the sequence value may be incremented modulo a maximum value each time a header is written. The process may, in some embodiments, also determine a sequence number for cached data values associated with the toy. The videogame may save data values for the toy in a cache from when the toy was previously played in the game. The cached data values may, for example, be useful when they contain updated values that had not been written to the toy before the toy was previously removed from the videogame.

In block 1121, the process determines which sequence value is most recent. The process may order the sequence values according to the order in which they would be generated and select the last in sequence as the most recent. When the process determines that the sequence value from data area 0 is most recent, the process continues to block 1123; when the process determines that the sequence value from data area 1 is most recent, the process continues to block 1125; when the process determines that the cached sequence value is most recent, the process continues to block 1127.

In block 1123, the toy is processed using data area 0. For example, the process may read toy information from data area 0 and use the information to add a character associated with the toy to the videogame. Thereafter the process returns.

In block 1125, the toy is processed using data area 1. Processing the toy is generally as for block 1123 except information from data area 1 is used. Thereafter the process returns.

In block 1127, the toy is processed using cached values. Processing the toy is generally as for block 1123 except cached information about the toy is used. Thereafter the process returns.

The process of FIG. 11 may include error checking of information read from the toy. When the process determines that data read from the toy contains an error or is unreliable, it may alter the processing. For example, if one of the sequence numbers read in block 1113 is unreliable, the associated data area may be excluded from further processing.

Figure 12:
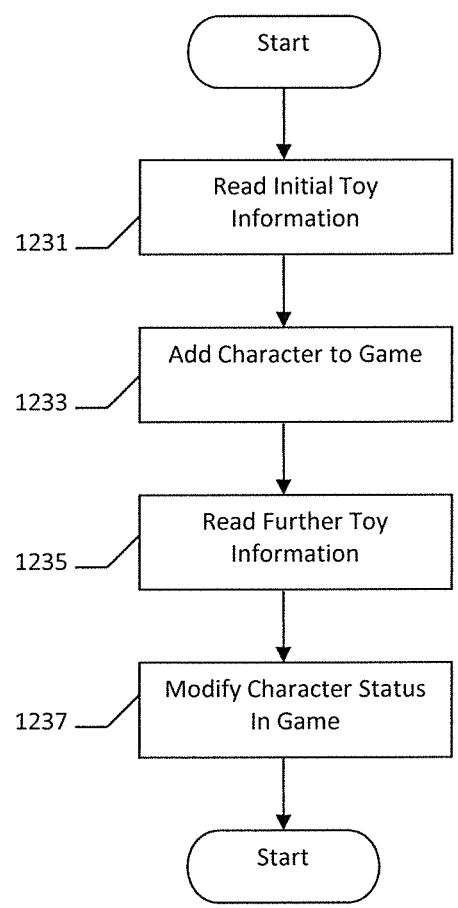
FIG. 12 is a flowchart of a further process for adding characters in a videogame in accordance with aspects of the invention.

FIG. 12 is a flowchart of a further process for adding characters in a videogame in accordance with aspects of the invention. The process may be performed by a videogame console, a videogame peripheral, or a combination of devices, and the process may use a processor configured by program instructions. The process of FIG. 12 may be performed as part of block 1006 of the process of FIG. 10 and also in association with the process of FIG. 11. The process may be used with toys that store information in a data structure as illustrated by FIG. 9.

In block 1231, the process reads initial information from the toy. The initial information includes information about the toy that is used to add the toy to game play. In some embodiments, the initial information is read using a process illustrated by FIG. 4. In some embodiments, the initial information includes a name of the toy and objects the toy is wearing. In one embodiment, the process commands a videogame peripheral to read the initial information from the toy. In another embodiment, the process may receive initial information that had previously been read by a videogame peripheral.

In block 1233, the process adds the toy to the videogame. For example, the process may display a representation of a character associated with the toy or an animated sequence for the character on the display screen of the videogame system illustrated by FIG. 1. Displaying the character utilizes the initial information read in block 1231. The process also makes the character available for subsequent game play.

In block 1235, the process reads further information from the toy. The further information is generally read in the same manner the initial information was read in block 1231. The further information may include, for example, a value indicating when the toy most recently joined the game, a value indicating when the toy was first used in the game, an indication of which player the toy belongs to, and an indication of what challenges or skill tests the character associated with the toy has completed in the game, and various information related to the status, for example the capabilities, of the character associated with the toy, for example as may have been modified or changed as a result of prior game play. The further information combined with the fixed and/or initial information generally includes complete information available from the toy.

In block 1237, the process modifies status of the character associated with the toy in the videogame. For example, the process may add details read in block 1235 to the character representing the toy and to the status of the character in the videogame. Thereafter the process returns.

Figure 13:
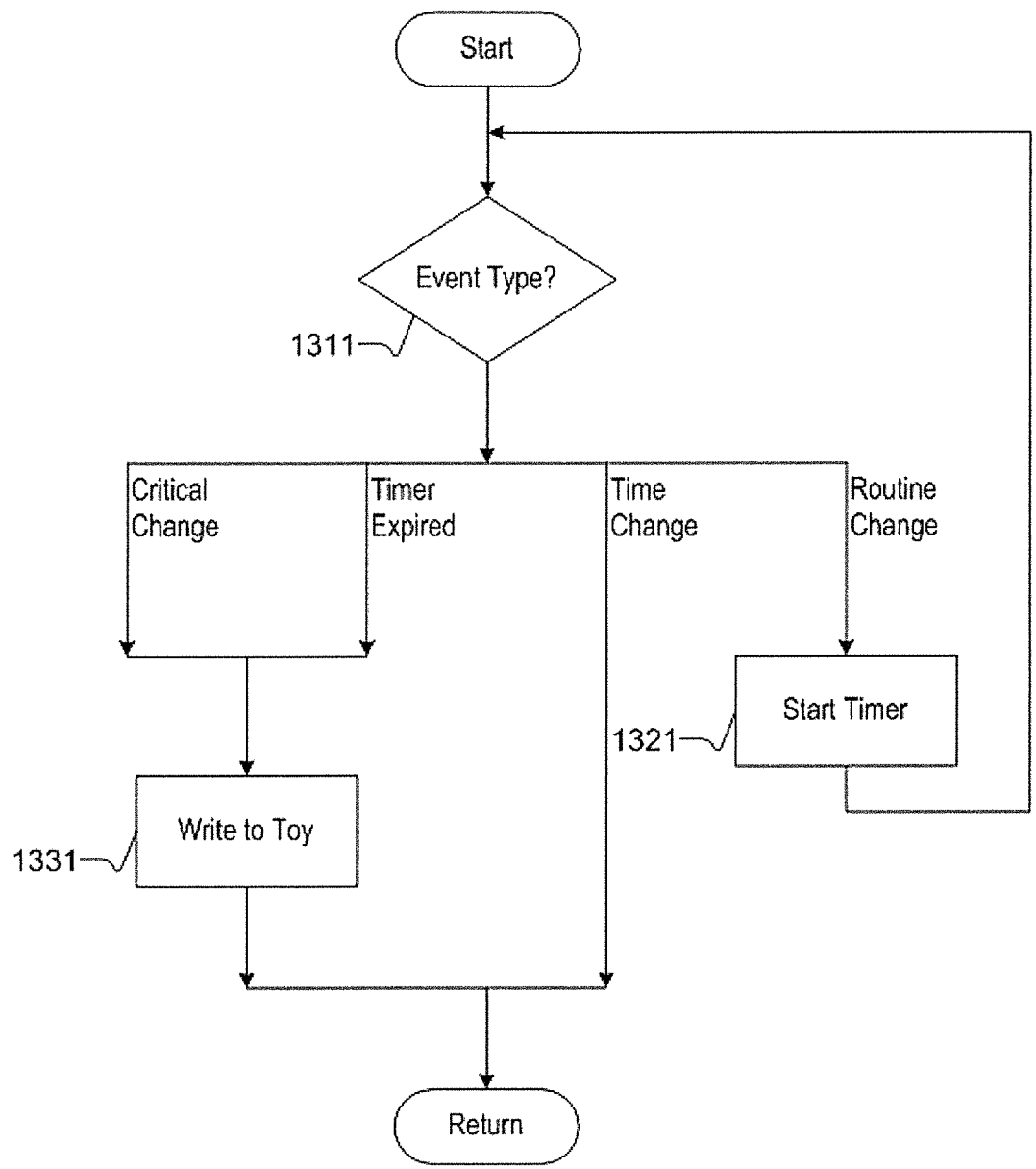
FIG. 13 is a flowchart of a process for events that update toy information in accordance with aspects of the invention.

FIG. 13 is a flowchart of a process for processing events that update toy information in accordance with aspects of the invention. The process is performed in association with a videogame and may be performed by, for example, the videogame console of FIG. 1 or the processor of FIG. 2, as configured by program instructions, in conjunction with associated circuitry. The process may be used with toys that store information in a data structure as illustrated by FIG. 9. Additionally, multiple instances of the process may be performed concurrently, for example, performing an instance of the process for each of multiple toys.

In block 1311, the process determines a type of event that may result in updating information in the toy. The process may determine the event type based at least in part on game play events.

In block 1311, if the process determines that the event type is a time change, the process returns. That is, a time-change event does not result in the process currently writing information to the toy. In some embodiments, the process writes time-based information, for example, a cumulative play time value or a last time played, to the toy when another event causes the process to write other information to the toy.

In block 1311, if the process determines that the event type is a critical type, the process continues to block 1331. A critical-type event is an event for which it is desirable to quickly update information in the toy. Critical-type events may include, for example, changes to the toy's name, changes to performance levels of the toy, or acquisition of upgrades for the toy.

In block 1311, if the process determines that the event type is a routine type, the process continues to block 1321. A routine-type event is an event for which writing information to the toy may be deferred. Routine-type events may include, for example, changes to the toy's score or changes to the experience level of the toy. Routine-type events may occur frequently during game play and thus it may be desirable to otherwise use the time that would be used to write to the toy, for example, to process information for another toy.

In block 1321, the process starts a timer. For example, the process may start a timer that expires in three seconds. When the timer is already running, the process may, in various embodiments, restart the timer or let it continue running from its current state. The process thereafter returns to block 1311.

Referring again to block 1311, when the timer expires, the process continues to block 1331.

In block 1331, the process writes information to the toy. The process may write information to the toy by commanding a videogame peripheral, such as the videogame peripheral of FIG. 2, to perform the write. The written information generally corresponds to the event analyzed in block 1311. For example, when the event is an event to change the toy's name, a new name is written to the toy. Additional information may also be written to the toy. For example, time-based information or information based on a routine-type event may be written to the toy concurrently with writing information based on a critical-type event. The timer started in block 1321 is stopped when the process writes information to the toy related to the routine-type event that resulted in starting the timer. Although the timer started in block 1321 is not used for critical-type events, the process may incur incidental delays before writing information to the toy in block 1331. Thereafter the process returns.

Figure 14:
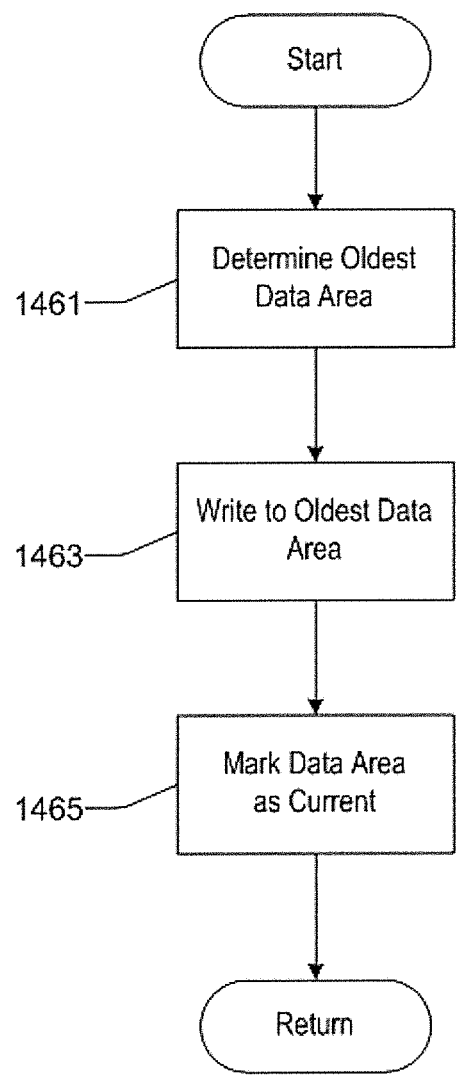
FIG. 14 is a flowchart of a process for writing information to a toy in accordance with aspects of the invention.

FIG. 14 is a flowchart of a process for writing information to a toy in accordance with aspects of the invention. The process is performed in association with or as part of a videogame. The process may be performed by a videogame console, a videogame peripheral, or a combination of devices, and the process may use a processor configured by program instructions. The process of FIG. 14 may be performed in association with the process for updating toy information of FIG. 13 and may be used with toys that store information in a data structure as illustrated by FIG. 9. Additionally, multiple instances of the process may be performed concurrently, for example, an instance of the process for each of multiple toys.

In block 1461, the process determines the oldest of multiple data areas in the toy. The process may determine the oldest data area using sequence values in a manner analogous to that used to determine the current data area in the process of FIG. 11. In a particular embodiment in which there are two data areas in the toy, the oldest data area is the data area that is not the current data area.

In block 1463, the process writes to the data area determined to the oldest in block 1461. Writes may be performed using a process as shown in FIG. 4. In some embodiments, the process compares the data to be written to the toy with data previously read from the toy and omits writes would not change values in the toy.

In block 1465, the process marks the data area written to in block 1463 as the current data area. For data areas with sequence values, the process writes the next value in the sequence to the toy. For example, the sequence value from the previously current data area may be incremented, modulo a maximum value, and written to the toy.

The process, in many embodiments, verifies that the information writes to the toy were successful. For example, the process may read the values back from the toy and compare the results to the expected values. In the event of an error, the process may retry writing the information to the toy. Additionally, the process may write to the toy in blocks of data and in a particular order, for example, a checksum for the data may be written last.

Figure 15:
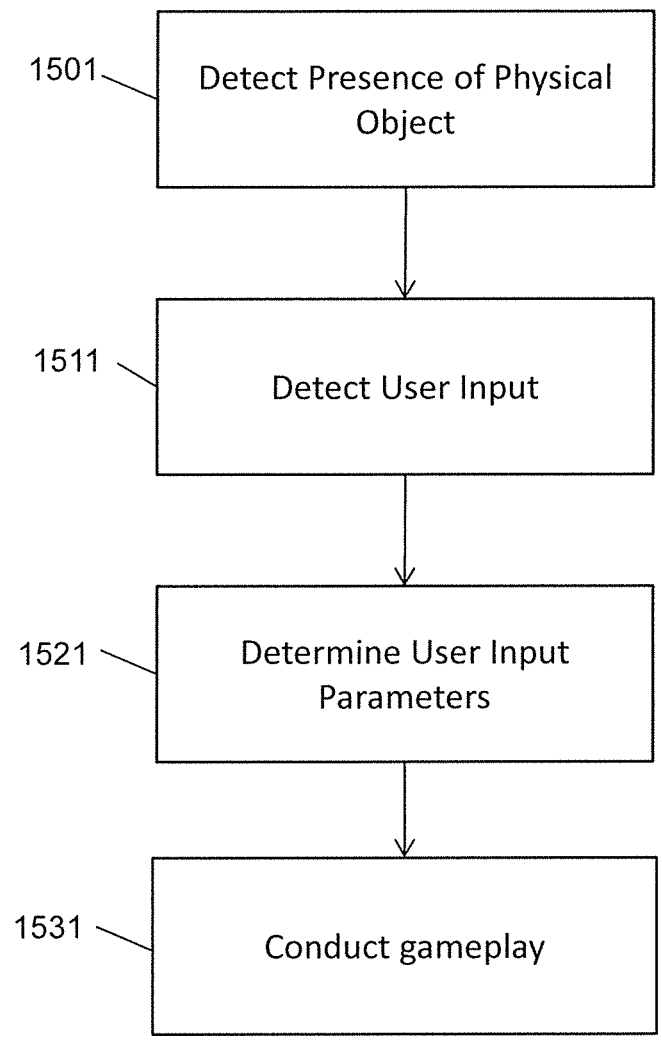
FIG. 15 is a flowchart of a process for conducting game play using a game-related physical object in accordance with aspects of the invention.

FIG. 15 is a flowchart of a process for presenting a user interface in accordance with aspects of the present invention. The process may be performed in association with or as part of a videogame. The process may be performed by a videogame console, a videogame peripheral, or a combination of devices, and the process may use a processor configured by program instructions.

In block 1501, the process detects the presence of a physical object. In some embodiments such is performed, for example, as discussed in U.S. patent application Ser. No. 13/109,956, filed May 17, 2011, entitled "Video Game With Concurrent Processing of Game-Related Objects," or as discussed in U.S. patent application Ser. No. 13/461,508, filed May 1, 2012, entitled "Server Based Interactive Video Game With Toys," the disclosures of both of which are incorporated by reference for all purposes. In some embodiments, the process uses a peripheral to detect the presence of the physical objects. In some embodiments, the detection device may be included in the game console. In some embodiments, the physical object may be detected when it is placed within one or more detection areas of the peripheral or game console. The physical object may be any toy capable of being represented as an in-game item (e.g., character, vehicle, weapon, building, location, treasure, etc.).

In block 1511, the process detects a user input received on the physical object. The user input may be, for example, a user triggering a touchpoint of the physical object, as previously described in this disclosure.

In block 1521, the process determines parameters relating to the user input. In some embodiments, parameters may include which of a plurality of touchpoints was triggered. In some embodiments, parameters may include the type of user input detected. User input types may include, for example, single taps/presses, double taps/presses, long taps/presses, and slides in a particular direction, and other input types discussed herein, depending on the touchpoint type.

In block 1531, the process conducts gameplay in response to the detected user input. The gameplay event conducted may be any gameplay event in a videogame. In some embodiments, the gameplay event may comprise presenting a user interface allowing the user to, for example, customize the physical object. In some embodiments, the gameplay event may depend on the parameters determined in block 1521. For example, triggering a touchpoint on a particular part of a toy may cause the process to present a user interface for customizing that particular toy part. Likewise, a particular type of input may be programmed to cause predefined gameplay events. For example, a double tap on a character's weapon may cause the virtual representation of the character to use the weapon in game, while a single tap on the weapon may present a user interface for customizing the weapon and/or cycle through options for customizing the weapon.

Figure 16:
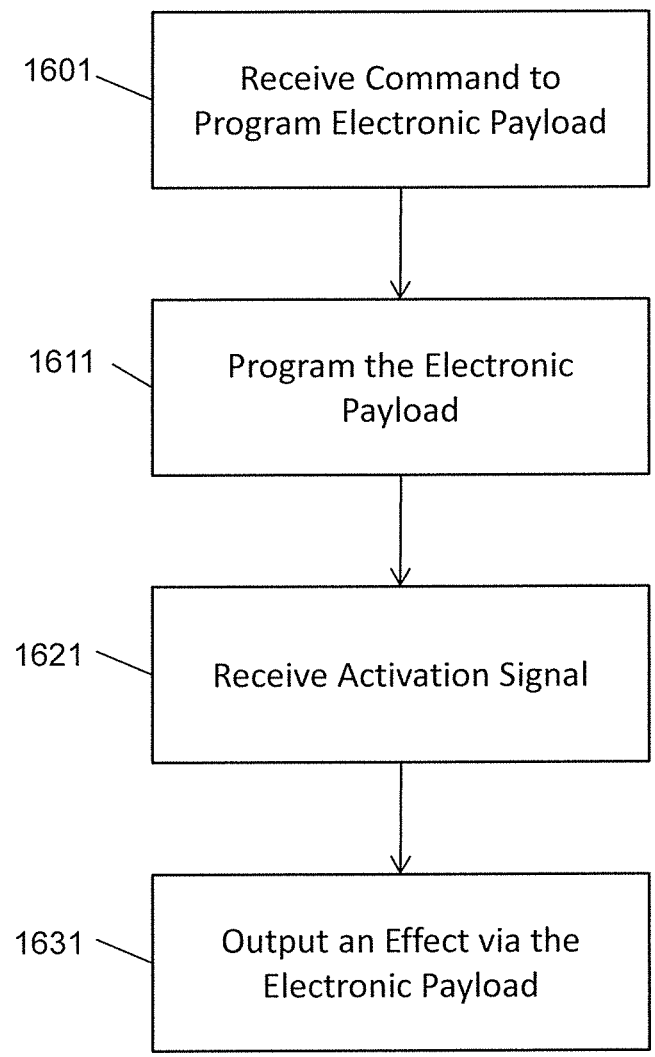
FIG. 16 is a flowchart of a process for programming and activating an electronic payload in accordance with aspects of the invention.

FIG. 16 is a flowchart of a process for programming an electronic payload of a toy in in accordance with aspects of the present invention. The process may be performed in association with or as part of a videogame. The process may be performed by a videogame console, a videogame peripheral, or a combination of devices, and the process may use a processor configured by program instructions.

In block 1601, the process receives a command to program an electronic payload. In some embodiments, the command to program the electronic payload is intended to enable to the electronic payload. In some embodiments, the command to program the electronic payload is intended to set the payload to one of a plurality of features stored in the toy or downloaded from the game console. In some embodiments, the command may further include a duration value indicating the duration of time for enabling the electronic payload. Other restrictions or limitation may also be included, for example, restrictions based on a type of gaming system on which the toy is used and restrictions on a number of game sessions or game areas in which the electronic payload may be enabled.

At block 1611, the process programs the electronic payload. The electronic payload may be programmed by writing the memory of the toy to, for example, enable the payload or set the payload to be one of a plurality of features stored in the toy or downloaded from an external source (e.g., the game console or some other compute resource). In some embodiments, the time duration for enabling the electronic payload may also be written to a location in the memory of the toy.

At block 1621 the process receives a signal to activate the payload. In some embodiments, the signal to activate the payload may be received from a touchpoint on the toy. In some embodiments, the signal to activate the payload may be received with the command to program the payload. At block 1631, the process outputs an effect via the electronic payload. In some embodiments, the effect may comprise, for example, a visual effect, a sound effect, motion or other effect.

Although the invention has been discussed with respect to various embodiments, it should be recognized that the invention comprises the novel and non-obvious claims supported by this disclosure.

What is claimed is:

1. A computer-implemented method for a videogame executing on a game device, comprising:
   detecting, by the videogame executing on the game device, the presence of a physical toy that is in communication the game device, the physical toy being capable of being represented as an in-game item and having a plurality of capacitive touch sensors;
   detecting, by the videogame executing on the game device, a user input received by at least one of the plurality of capacitive touch sensors of the physical toy;
   presenting, by the videogame executing on the game device, a virtual representation of the toy, the virtual representation comprising a plurality of virtual parts with each of the plurality of virtual parts corresponding to at least one of the plurality of capacitive touch sensors of the toy; and
   in response to detecting the user input received by the at least one of the plurality of capacitive touch sensors, presenting, by the videogame executing on the game device, a user interface for customizing a virtual representation of the one of the plurality of virtual parts corresponding to the at least one of the plurality of capacitive touch sensors that received the user input.

2. The computer-implemented method of claim 1, wherein the presenting of the user interface comprises:
   determining at least one parameter relating to the user input received by the at least one of the plurality of capacitive touch sensors;
   determining the one of the plurality of virtual parts corresponding to the at least one of the plurality of capacitive touch sensors based on the at least one parameter.

3. The computer-implemented method of claim 2, wherein the at least one parameter is a type of the user input, the type being one of a single tap, double tap, long press, or slide in a particular direction.

4. The computer-implemented method of claim 1, further comprising:
   detecting, by the videogame executing on the game device, a second user input received by the at least one of the plurality of capacitive touch sensors;
   in response to the detecting of the second user input received by the at least one of the plurality capacitive touch sensors, changing, by the videogame executing on a game device, an attribute of the virtual representation of the one of the plurality of virtual parts corresponding to the at least one of the plurality of capacitive touch sensors.

5. The computer-implemented method of claim 4, wherein the changing of an attribute comprises:
   determining at least one parameter relating to the second user input received by the at least one of the plurality of capacitive touch sensors; and
   determining the attribute of the virtual representation to change based on the at least one parameter of the second input.

6. The computer-implemented method of claim 5, wherein the at least one parameter is a type of the second user input, the type being one of a single tap, double tap, long press, or slide in a particular direction.

7. The computer implemented method of claim 4 further comprising:
   storing, by the video game executing on the game device, information relating to the change of the attribute in a memory of the toy.

8. The computer implemented method of claim 1 further comprising:
   detecting, by the video game executing on the game device, the toy within a detection area.

9. The computer implemented method of claim 8 further comprising:
   reading, by the video game executing on the game device, identification information from a memory of the toy in response to detecting the toy in the detection area.

* * * * *